United States Patent
Leuschner et al.

(10) Patent No.: US 10,333,630 B2
(45) Date of Patent: Jun. 25, 2019

(54) APPARATUS FOR REDUCING A MAGNETIC COUPLING BETWEEN A FIRST ELECTRONIC CIRCUIT AND A SECOND ELECTRONIC CIRCUIT

(71) Applicant: Intel IP Corporation, Santa Clara, CA (US)

(72) Inventors: Stephan Leuschner, Munich (DE); Peter Pfann, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/776,083

(22) PCT Filed: Oct. 21, 2016

(86) PCT No.: PCT/IB2016/056346
§ 371 (c)(1),
(2) Date: May 15, 2018

(87) PCT Pub. No.: WO2017/103702
PCT Pub. Date: Jun. 22, 2017

(65) Prior Publication Data
US 2018/0331769 A1  Nov. 15, 2018

(30) Foreign Application Priority Data
Dec. 15, 2015 (EP) .................................... 15200151

(51) Int. Cl.
| | | |
|---|---|---|
| H04B 15/00 | (2006.01) | |
| H04B 1/525 | (2015.01) | |
| H04B 15/04 | (2006.01) | |
| H01F 27/28 | (2006.01) | |
| H01F 27/38 | (2006.01) | |

(52) U.S. Cl.
CPC .......... H04B 15/005 (2013.01); H01F 27/28 (2013.01); H01F 27/385 (2013.01); H04B 1/525 (2013.01); H04B 15/04 (2013.01)

(58) Field of Classification Search
CPC combination set(s) only.
See application file for complete search history.

(56) References Cited

U.S. PATENT DOCUMENTS

| | | | |
|---|---|---|---|
| 7,466,284 B2 * | 12/2008 | Barry .................. | H01Q 1/2283 343/700 MS |
| 9,257,224 B2 * | 2/2016 | Ortiz ..................... | H01F 27/362 |
| 2008/0150658 A1 | 6/2008 | Vos | |
| 2009/0290392 A1 | 11/2009 | Ganev et al. | |
| 2013/0043961 A1 | 2/2013 | Gebauer et al. | |
| 2014/0266432 A1 | 9/2014 | Scott et al. | |
| 2014/0266531 A1 | 9/2014 | Leipold et al. | |
| 2015/0255530 A1 | 9/2015 | Lenive | |
| 2015/0302976 A1 | 10/2015 | Chang et al. | |

* cited by examiner

*Primary Examiner* — Jeffery S Zweizig
(74) *Attorney, Agent, or Firm* — 2SPL Patentanwälte PartG mbB; Mani Arabi

(57) ABSTRACT

An apparatus for reducing a magnetic coupling between a first electronic circuit and a second electronic circuit is provided. The apparatus includes a conductor loop enclosing the first electronic circuit or the second electronic circuit, and a tuning element coupled to the conductor loop. The conductor loop and the tuning element form a resonant circuit, wherein the tuning element is configured to adjust a resonance frequency of the resonant circuit to a frequency related to a frequency of a signal processed by the second electronic circuit.

23 Claims, 7 Drawing Sheets

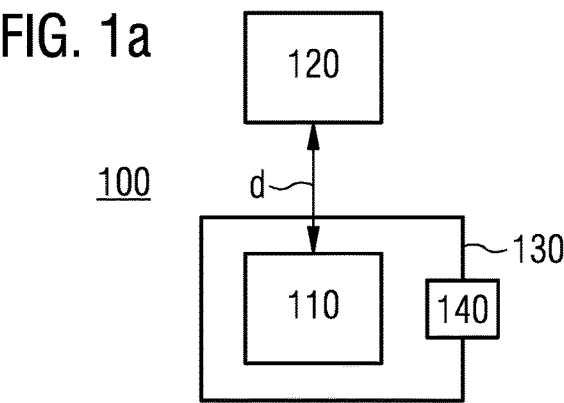
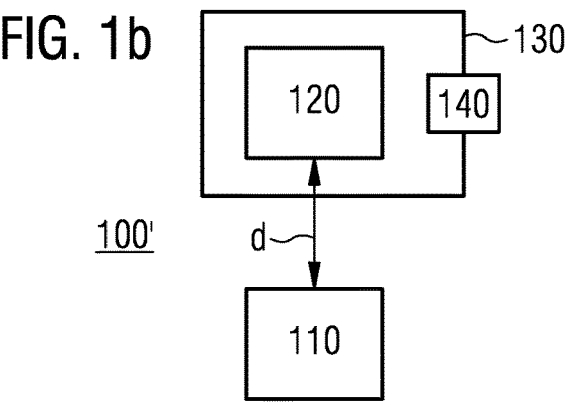
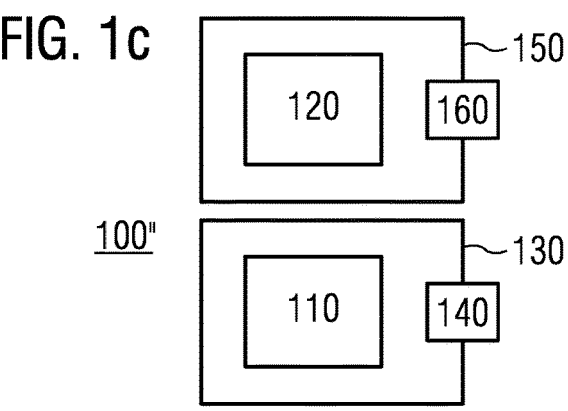

APPARATUS FOR REDUCING A MAGNETIC COUPLING BETWEEN A FIRST ELECTRONIC CIRCUIT AND A SECOND ELECTRONIC CIRCUIT

FIELD

Examples relate to magnetic shielding of electronic circuits. In particular, examples relate to an apparatus for reducing a magnetic coupling between a first electronic circuit and a second electronic circuit.

BACKGROUND

Crosstalk is one of the crucial problems of modern Radio Frequency (RF) circuits. One mechanism generating crosstalk between electronic components or circuits is magnetic coupling. For example, electronic components or circuits of a transmit path of a transceiver may generate magnetic field components not only at the frequency of the RF transmit signal that is processed in the transmit path. Additionally, the electronic components or circuits of the transmit path may generate magnetic fields components at harmonics of the frequency of the processed RF transmit signal. These magnetic components may affect the performance of the transceiver's receive path due to magnetic coupling to electronic components or circuits of the receive path. For example, in a carrier aggregation scenario, a low band signal (e.g. 700-900 MHz) processed in the transmit path may cause magnetic components at harmonics of the low band signal (e.g. 2100-2700 MHz), which may affect a receive signal the receive path since the receive signal may have a frequency similar to the magnetic field components at the harmonics of the low band signal.

Hence, there may be a desire for a reduced magnetic coupling between electronic components or circuits.

BRIEF DESCRIPTION OF THE FIGURES

Some examples of apparatuses and/or methods will be described in the following by way of example only, and with reference to the accompanying figures, in which FIG. 1a illustrates an example of an apparatus for reducing a magnetic coupling between a first electronic circuit and a second electronic circuit;

FIG. 1b illustrates another example of an apparatus for reducing a magnetic coupling between a first electronic circuit and a second electronic circuit;

FIG. 1c illustrates a further example of an apparatus for reducing a magnetic coupling between a first electronic circuit and a second electronic circuit;

DETAILED DESCRIPTION

Figure 2:
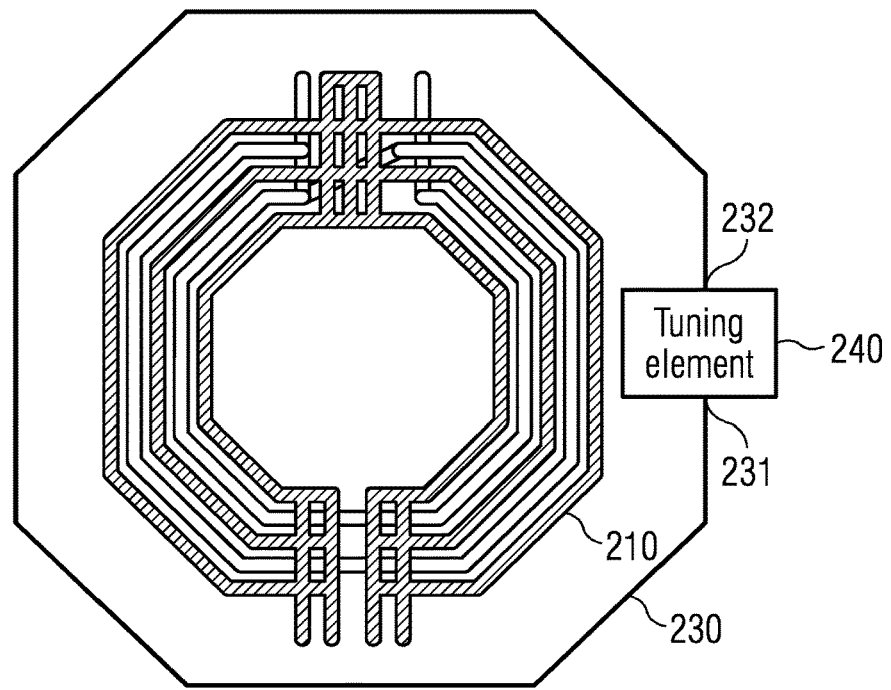
FIG. 2 illustrates an example of an apparatus for reducing a magnetic coupling between an impedance matching network of a transmit path and another electronic circuit.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", to name just a few examples).

The terminology used herein is for the purpose of describing particular examples is not intended to be limiting for further examples. Whenever a singular form such as "a," "an" and "the" is used and using only a single element is neither explicitly or implicitly defined as being mandatory, further examples may also plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In some examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1a illustrates an apparatus 100 for reducing a magnetic coupling between a first electronic circuit 110 and a second electronic circuit 120. The second electronic circuit 120 processes a (first) signal having a certain frequency. For example, the signal processed by the second electronic circuit may be a RF signal. The first electronic circuit 110 processes a second signal (e.g. a RF signal). The first electronic circuits 110 may be any electronic circuit generating a magnetic field, whereas the second electronic circuit 120 may be any electronic circuit being sensitive to a magnetic field. For example, the first electronic circuit 110 or the second electronic circuit 120 may comprise an inductive element (e.g. a coil). In some examples, the first electronic circuit 110 may be an oscillator (e.g. a Digitally Controlled Oscillator, DCO, or a Voltage Controlled Oscillator, VCO), or an impedance matching network (impedance matching circuit) of a transceiver's transmit path. The second electronic circuit may, in some examples, be an impedance matching network of a transceiver's receive path, a power supply network of the receive path, a VCO or a DCO. However, the first and second electronic circuits 110, 120 are not limited to mobile communications applications. The first and second electronic circuits 110, 120 may be electronic circuits of any application (e.g. medical devices, home entertainment devices, military devices or automotive devices).

The apparatus 100 of FIG. 1a comprises a conductor loop 130, which encloses the first electronic circuit 110. Alternatively, the conductor loop 130 may enclose the second electronic circuit 120 as illustrated in FIG. 1b. In FIGS. 1a and 1b, the conductor loop 130 is illustrated as rectangular loop. However, the conductor loop 130 is not limited to this shape. The conductor loop 130 may in general have any shape. For example, conductor loop 130 may have a circular shape, an elliptical shape, or a polygonal shape. The conductor loop 130 may be made of any conducting material (e.g. metal). Further, the conductor loop 130 may comprise a single winding or a plurality of windings (i.e. two or more windings).

A tuning element 140 is coupled to the conductor loop 130. The conductor loop 130 and the tuning element 140 form a resonant circuit. The tuning element 140 adjusts the resonance frequency of the resonant circuit to a frequency which is related to the frequency of a signal being processed by the second electronic circuit 120. For example, the tuning element 140 may comprise a capacitive element (e.g. a capacitor), which is coupled to the conductor loop 130. Together with the self-inductance of the conductor loop 130, an LC resonant circuit (or an RLC resonant circuit) may be formed. The resonance frequency $f_{res}$ of the LC resonant circuit may be adjusted according to $$f_{res} = \frac{1}{2\pi\sqrt{LC}}, \qquad (1)$$

with L denoting the inductance of the LC resonant circuit, and C denoting the capacitance of the LC resonant circuit. Hence, assuming that the inductance of the resonant circuit is determined by the self-inductance of the conductor loop (which may be adjustable), the resonance frequency of the resonant circuit may be adjusted by selecting (adjusting) the capacitance value of the tuning element's capacitive element.

However, the tuning element 140 is not limited to the above example. In particular, the tuning element 140 may comprise alternative or additional components. For example, the tuning element 140 may comprises a varactor diode or a tunable MEMS (Micro-Electromechanical System) capacitor in order to provide an adjustable capacitance. The tuning element 140 may, e.g., adjust the resonance frequency of the resonant circuit to be equal to (or be approximately, or be in the range of) the frequency of the signal processed by the second electronic circuit 120.

Further, the inductance of the resonant circuit may be tuned. For example, the tuning element 140 may comprise one or more static, switchable or tunable inductance elements. Alternatively or additionally, the conductor loop 130 may comprise an adjustable inductance. For example, if the conductor loop 130 comprises a first winding and a second winding, the first winding and the second winding may be connected in series or in parallel in order to adjust the self-inductance of the conductor loop 130. For example, the first winding and the second winding may be connected in series at a first time instant, and be connected in parallel at a different second time instant. When connected in parallel, the self-inductance of the conductor loop 130 may be substantially equal to the inductance of one of the windings. When connected in series, the self-inductance of the conductor loop 130 may, e.g., be substantially a multiple of the individual inductance of one of the windings. For example, the tuning element 140 may be configured to (alternatively) connect to the first and second windings in series or parallel. It is evident for a person skilled in the art that not only two but any plurality of windings may be connected to each other.

The conductor loop 130 itself magnetically couples to the first electronic circuit 110. Accordingly, a current is induced in the conductor loop 130. The induced current generates another magnetic field that opposes the initial magnetic field caused by the first electronic circuit 110 according to Lenz's law. Hence, the overall magnetic field outside the conductor loop 130 in FIG. 1*a* is reduced. Accordingly, the overall magnetic field inside the conductor loop 130 is reduced in FIG. 1*b*. Since the resonance frequency of the resonant circuit formed by the conductor loop 130 and the tuning element 140 is tuned to a frequency related to the frequency of the signal processed by the second electronic circuit 120, the components of the magnetic field which affect the signal processing by the second electronic circuit 120 most may be effectively reduced (minimized). Accordingly, the magnetic coupling between the first electronic circuit 110 and the second electronic circuit 120 may be reduced. Hence, a distortion of the second electronic circuit 120 by the magnetic field generated by the first electronic circuit 110 may be reduced. The reduced magnetic coupling may allow to reduce a distance d between the first electronic circuit 110 and the second electronic circuit 120. For example, for the first electronic circuit 110 and the second electronic circuit 120 being comprised by an integrated circuit, an integration density may be increased.

Moreover, if the second signal processed by the first electronic circuit 110 has a frequency different from the tuned resonance frequency of the resonant circuit (e.g. the resonance frequency is a multiple of the frequency of the second signal), an affection of the signal processing by the first electronic circuit 110 by the conductor loop 130 may be avoided. For example, for the first electronic circuit 110 being an impedance matching network of a transmit path, an affection of the output power of the impedance matching network at the frequency of the processed second signal may be avoided, while a magnetic coupling to the second electronic circuit 120 at the resonance frequency may be reduced. Accordingly, a distance of electronic circuits to the impedance matching network on a transceiver may be reduced.

FIG. 1*c* illustrates another apparatus 100" comprising two tuned conductor loops, which enclose the first electronic circuit 110 and the second electronic circuit 120, respectively. The first conductor loop 130 encloses the first electronic circuit 110 and is coupled to a first tuning element 140, wherein the first conductor loop 130 and the first tuning element 140 form a first resonant circuit. The second conductor loop 150 encloses the second electronic circuit 120 and is coupled to a second tuning element 160, wherein the second conductor loop 150 and the second tuning element 160 form a second resonant circuit.

The first tuning element 140 adjusts the resonance frequency of the first resonant circuit to a first frequency which is related to the frequency of a signal being processed by the second electronic circuit 120, and the second tuning element 160 adjusts the resonance frequency of the second resonant circuit to a second frequency which is related to the frequency of the signal being processed by the second electronic circuit 120. The first and the second frequency may be equal to or different from each other. For example, for the first and second resonant circuits being tuned to different resonance frequencies, each of the resonant circuits may reduce the magnetic coupling between the first electronic circuit 110 and the second electronic circuit 120 in a certain frequency range. Accordingly, the magnetic coupling between both electronic circuits 110, 120 may be reduced over a wider frequency range.

In FIG. 2, an apparatus 200 for reducing a magnetic coupling between an impedance matching network 210 of a transceiver's transmit path and another electronic circuit is illustrated. The illustrated impedance matching network 210 has a substantially octagonal shape. Accordingly, the conductor loop 230 has a substantially octagonal shape. The tuning element 240 is coupled to the end 231, 232 of the conductor loop 230.

Figure 3:
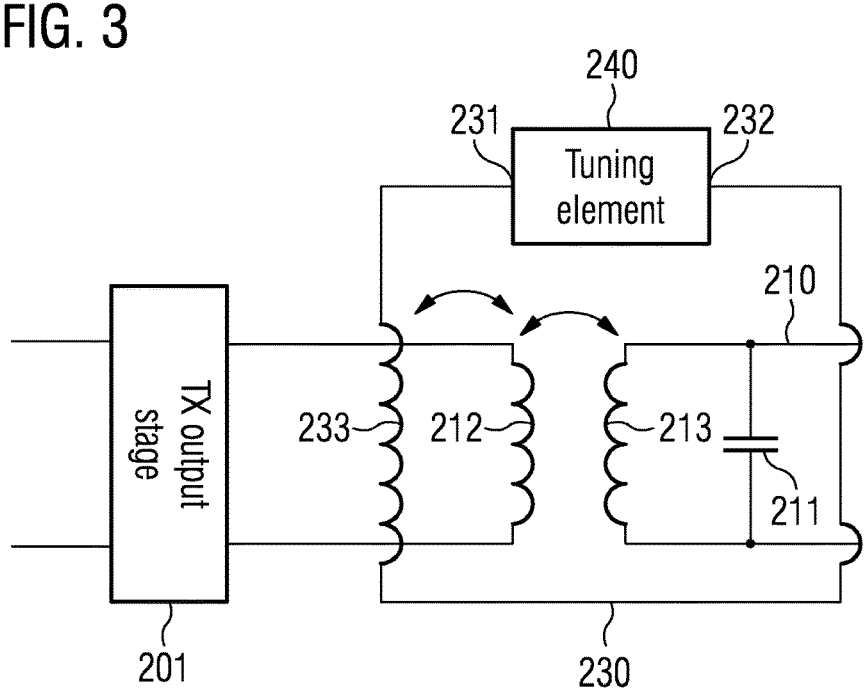
FIG. 3 illustrates a schematic of the apparatus illustrated in FIG. 2.

FIG. 3 illustrates a schematic of the apparatus 200 of FIG. 2. The impedance matching network 210 is coupled to an output stage 201 of the transmit path (e.g. a Radio Frequency Digital-to-Analog Converter, RFDAC) for matching the impedance of the output stage 201 to the impedance of an antenna (not illustrated), which radiates the transmit signal provided by the output stage 201 to the environment. Therefore, the impedance matching network 210 comprises a capacitor 211 which is coupled in parallel to a second inductance coil 213, which is magnetically coupled to a first inductance coil 212 as indicated by the arrow in FIG. 3.

The first inductance coil 212 and the second inductance coil 213 further couple magnetically to the conductor loop 230 since the conductor loop 230 comprises a self-inductance as indicated by the winding 233 of the conductor loop 230. Accordingly, a current is generated in the conductor loop 230, which itself causes a magnetic field that opposes the magnetic field generated by the first and second inductance coils 212, 213 of the impedance matching network

210. By means of the tuning element 240 that is coupled to the ends 231, 232 of the open conductor loop 230, a resonance frequency of the resonant circuit that is formed by the conductor loop 230 and the tuning element 240 may be adjusted. Accordingly, a frequency of the opposing magnetic field being generated by the current induced in the conductor loop 230 may be adjusted. Hence, the opposing magnetic field may reduce an effective, overall magnetic field as seen by a second electronic circuit outside the conductor loop in a desired frequency range. For example, the resonance frequency may be chosen such that the opposing magnetic field has a frequency in the range of a frequency of a signal processed by the second electronic circuit. Accordingly, an affection of the signal processing by the second electronic circuit by the magnetic field generated by the impedance matching network 210 may be reduced due to the frequency adjusted opposing magnetic field, which is generated by the conductor loop 230 and the tuning element 240.

Figure 4:
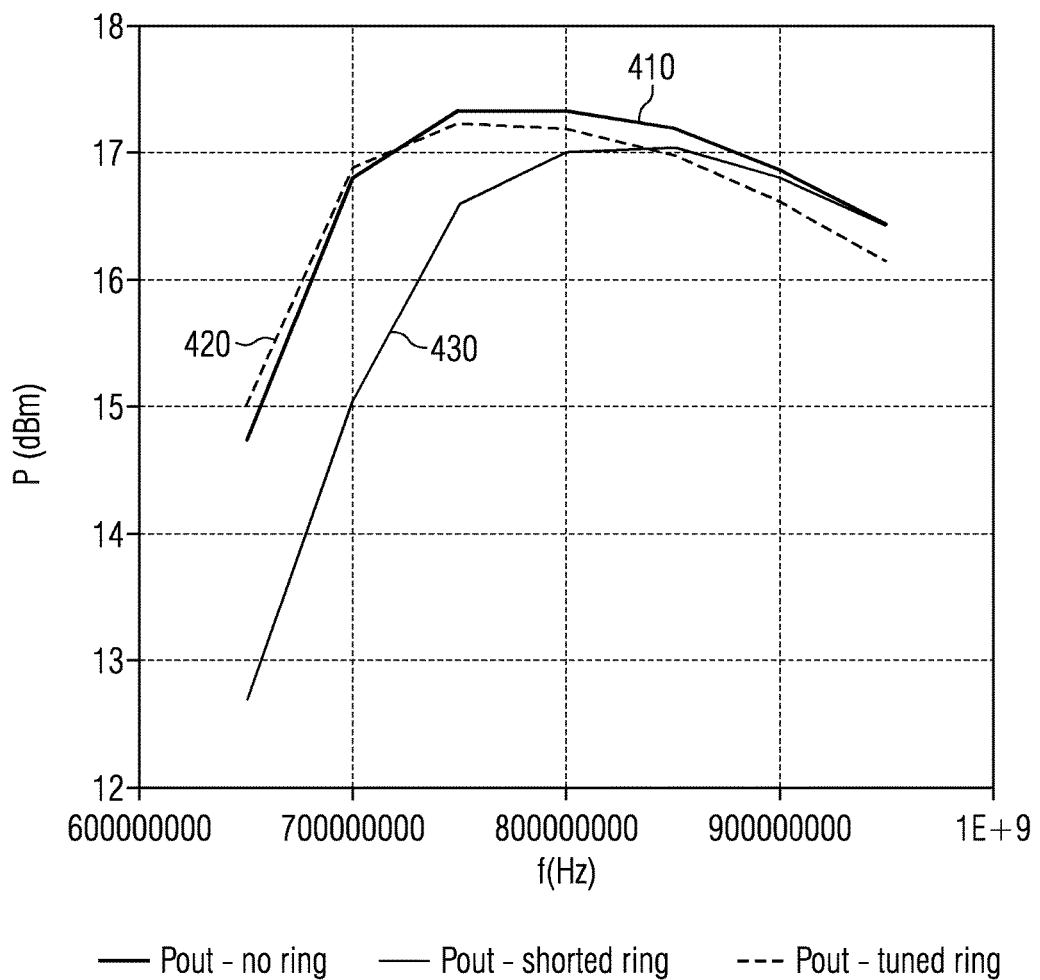
FIG. 4 illustrates a comparison of an output power of an impedance matching network of a transmit path for different magnetic shielding concepts.

In FIG. 4, a comparison of an output power of an impedance matching network (e.g. as illustrated in FIGS. 2 and 3) of a transmit path for different magnetic shielding concepts is illustrated. The abscissa of FIG. 4 denotes a frequency of a signal processed by the impedance matching network, whereas the ordinate illustrates a signal power of the signal processed by the impedance matching network.

Line 410 represents a situation, where no shielding structure is provided for reducing a magnetic coupling between the impedance matching network and a second electronic circuit or component. Line 420 illustrates a situation, where an apparatus for reducing a magnetic coupling between the impedance matching network and the second electronic circuit according to the proposed concept is provided. It is evident from FIG. 4, that the output power of the processed signal is substantially equal over the illustrated frequency range for both situations.

For comparison, a magnetic shielding structure according to the state of the art is represented by line 430. Line 430 represents a situation where a metal ring alone encloses the impedance matching network. It is evident from FIG. 4 that a state of the art magnetic shielding greatly reduces the output power of the impedance matching network. In particular, for the frequency range between approx. 650 MHz and 800 MHz, the signal power is reduced by approx. 2 Decibel (dB). The metal ring merely generates a magnetic field at the frequency of the signal processed by the impedance matching network. Accordingly, the magnetic field generated by the stand-alone metal ring greatly affects to the operation of the impedance matching network. Hence, causing loss of output power.

To the contrary, the resonance frequency of the resonant circuit formed by the conductor loop and the tuning element according to the proposed concept is tuned to a frequency which is related to a frequency of a signal that is processed by the other electronic circuit. In other words, the resonance frequency is different from the frequency of the signal processed by the impedance matching network. Accordingly, the affection of the impedance matching network by the magnetic field generated by conductor loop is negligible as is evident from FIG. 4. Moreover, the proposed concept may allow to reduce the effective magnetic field as seen by the other electronic circuit in a frequency range which affects the signal processing of the other electronic circuit most.

In other words, a means for reducing the magnetic field coupling into other circuit blocks without affecting the RF performance of the transmit path may be provided. A tuned shield ring structure may be used to pick up energy from the magnetic field at a tuning frequency while not affecting the performance and impedance transformation of the transmit matching network at a fundamental frequency (i.e. the frequency of the processed signal). This kind of shielding may enable to further reduction of the distance between an aggressor circuit block (i.e. a block generating a magnetic field) and victim circuit blocks (i.e. blocks being sensitive to magnetic fields). Thus an integration density of an integrated circuit may be increased.

The general principle of the proposed shield structure was shown in the above FIGS., where a conductor loop (e.g. a metal ring structure) is placed around the aggressor circuit (e.g. an output matching network). The conductor loop itself magnetically couples to the matching network. Due to the magnetic coupling, a current is generated inside the loop, which in turn generates a magnetic field opposing the initial magnetic field of the output matching network. Thus, the overall field outside the structure may be reduced. In order to not affect the matching network properties at the fundamental frequency, the shield ring structure is tuned to the desired frequency.

FIGS. 5 to 8 illustrate various apparatuses for reducing a magnetic coupling between an impedance matching network of a transmit path (as an example for a first electronic circuit) and another (second) electronic circuit. In connection with FIGS. 5 to 8, various implementation examples for the tuning element will be described. The apparatuses illustrated in FIGS. 5 to 8 are based on the example discussed above in connection with FIG. 2. Hence, the following discussion will mainly focus on the various implementation examples for the tuning element.

Figure 5:
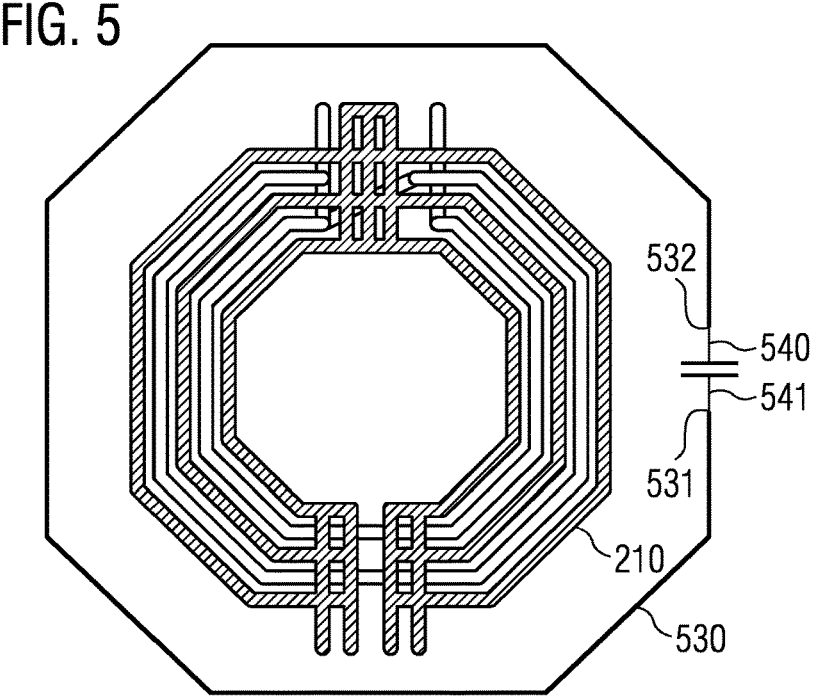
FIG. 5 illustrates an example of an apparatus for reducing a magnetic coupling between an impedance matching network of a transmit path and another electronic circuit.

In FIG. 5, the tuning element 540 comprises a capacitor 541 as capacitive element, which is coupled to the ends 531, 532 of the conductor loop 530. Together with the self-inductance of the conductor loop 530, the capacitor 541 forms a LC resonant circuit, which may allow to adjust the resonance frequency of the LC resonant circuit according to equation (1) by choosing an suitable capacitance value for the capacitor 541. For example, the capacitor 541 may be variable capacitor, i.e. a capacitance value of the capacitor may be adjusted within a given value range, so that a frequency range for the resonance frequency of the resonant circuit may be provided according to equation (1).

Figure 6:
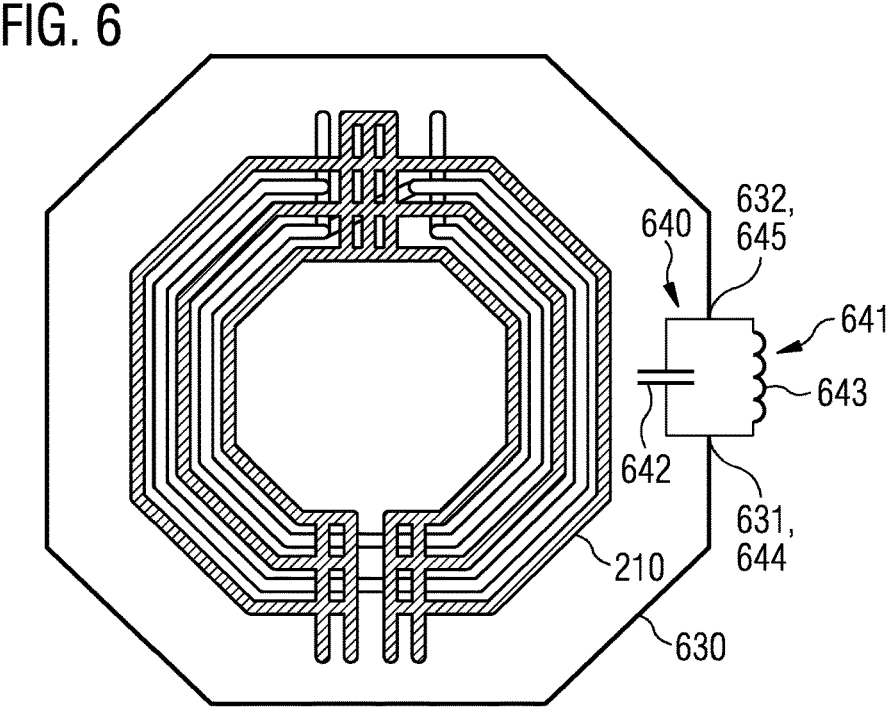
FIG. 6 illustrates another example of an apparatus for reducing a magnetic coupling between an impedance matching network of a transmit path and another electronic circuit.

FIG. 6 illustrates an implementation, in which the tuning element 640 comprises a parallel resonant circuit 641 coupled to the ends 631, 632 of the conductor loop 630. The parallel resonant circuit 641 comprises a capacitor 642 as capacitive element, and an inductance coil 643 as inductive element. The capacitor 642 and the inductance coil are connected in parallel between a first terminal 644 and a second terminal 645 of the parallel resonant circuit 641. The first terminal 644 and the second terminal 645 are themselves coupled to the ends 631, 632 of the conductor loop 630. The parallel resonant circuit 641 may allow to implement a more complex filter function compared to the example of FIG. 5.

Figure 7:
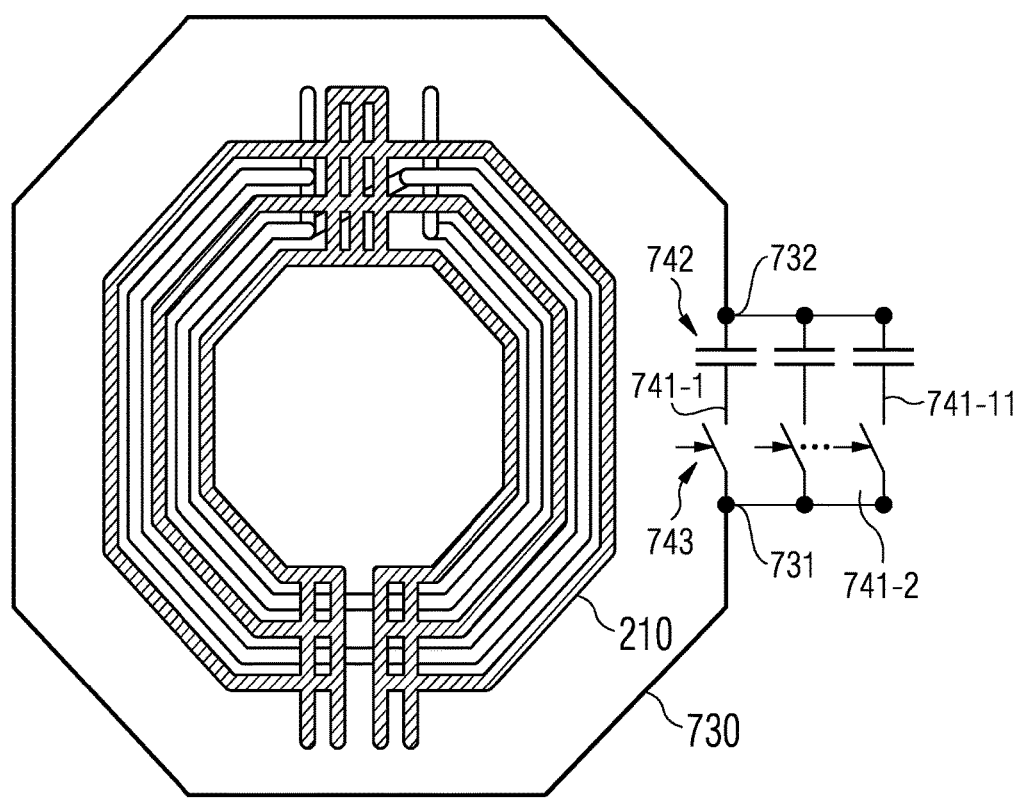
FIG. 7 illustrates a further example of an apparatus for reducing a magnetic coupling between an impedance matching network of a transmit path and another electronic circuit.

An example of the tuning element, which may allow a higher bandwidth for the resonance frequency of the resonant circuit formed by the conductor loop and the tuning element is illustrated in FIG. 7. In FIG. 7, the tuning element 740 comprises a plurality of switchable capacitive lines 741-1, 741-2, . . . , 741-n. The switchable capacitive lines 741-1, 741-2, . . . , 741-n are connected in parallel between ends 731, 732 of the conductor loop 730. Each of the switchable capacitive lines 741-1, 741-2, 741-n comprises a switching element 743 (e.g. a mechanical switch or a semiconductor switch) and a capacitive element 742 (e.g. a capacitor), which are connected in series. Hence, the tuning element 740 may provide an adjustable capacitance, so that according to equation (1) an adjustable resonance frequency of the resonant circuit that is formed by the conductor loop 730 and the tuning element 740 may be provided.

For example, a number of switchable capacitive lines having a closed switching element 743 may be based on the frequency of the signal processed by another (second) electronic circuit, which is sensitive to the magnetic field generated by the impedance matching network 210 (as an example for a first electronic circuit, i.e., an aggressor circuit). In some examples, the apparatus may thus further comprise a control unit which is configured to control an opening and/or closing of the respective switching elements 743 of the switchable capacitive lines 741-1, 741-2, . . . , 741-n based on the frequency of the signal processed by second electronic circuit.

Although, three switchable capacitive lines are illustrated in FIG. 7, any number of switchable capacitive lines may be used. For example, the tuning element may comprise 2, 3, 5, 10, 20, 50, 100, . . . or more switchable capacitive lines.

Figure 8:
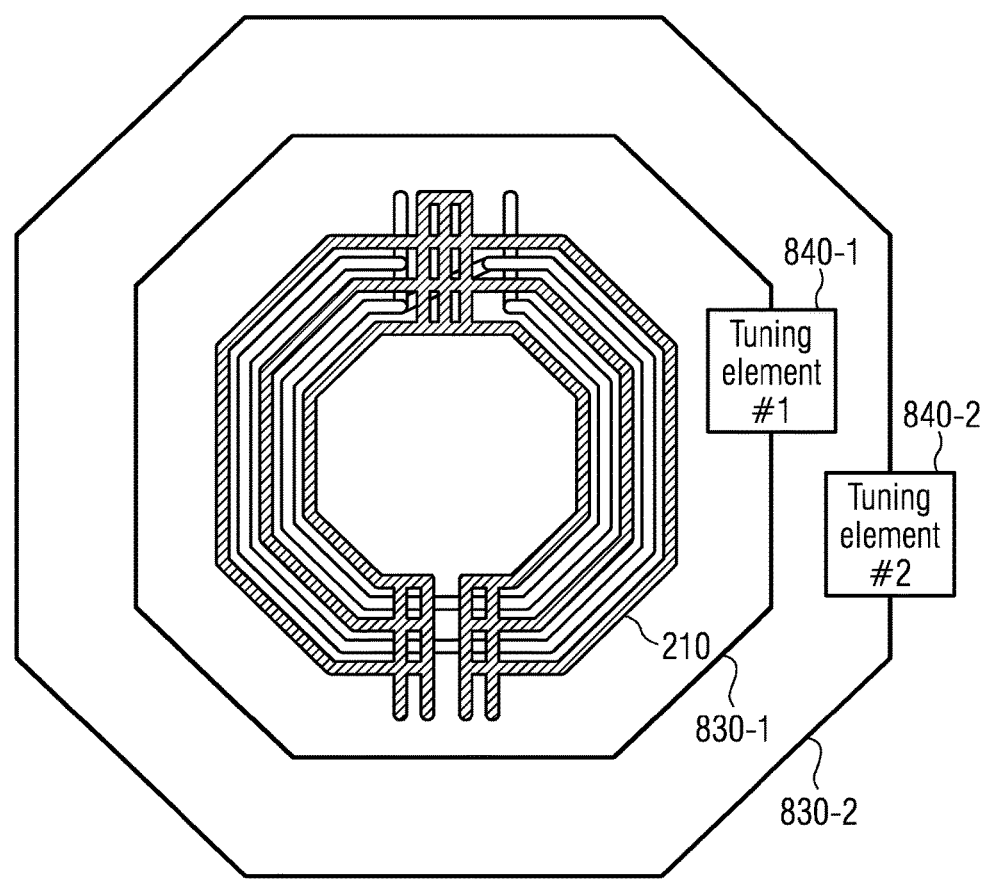
FIG. 8 illustrates another example of an apparatus for reducing a magnetic coupling between an impedance matching network of a transmit path and another electronic circuit.

Another implementation allowing a higher bandwidth for the resonance frequency is illustrated in FIG. 8. The apparatus illustrated in FIG. 8 comprises two resonant circuits. A first resonant circuit is formed by a first conductor loop 830-1 and a first tuning element 840-1, whereas a second resonant circuit is formed by a second conductor loop 830-2 and a second tuning element 840-2. The first resonant circuit is tuned to a first resonance frequency, whereas the second resonant circuit is tuned to a different second resonance frequency. That is, a plurality of resonant circuits for different frequency regions may be provided. Accordingly, each of the resonant circuits may reduce the magnetic coupling between the impedance matching network 210 (as an example for a first electronic circuit, i.e., an aggressor circuit) and another electronic circuit (which is sensitive to the magnetic field generated by the impedance matching network 210) in a certain frequency range. The other (second) electronic circuit may thus process signals having different frequencies with at least reduced affection by the magnetic field generated by the impedance matching network 210. It goes without saying that the proposed concept is not limited to implementation where two resonant circuits enclose an electronic circuit. Any number of resonant circuits comprising a conductor loop and a tuning element may be used.

It is to be noted that in the foregoing description of the figures, examples were illustrated in which the conductor loop encloses a specific one of the exemplary first and second electronic circuits. It is evident for a person skilled in the art that the conductor loop may as well enclose the other of the exemplary first and second electronic circuits illustrated in the foregoing figures. Moreover, in the figures, the conductor loop is not physically coupled to one of the electronic circuits. However, it is evident for a person skilled in the art, that the conductor loop may as well be physically coupled to (shorted with) one of the electronic circuits without departing from the scope of the appended patent claims.

The apparatus for reducing a magnetic coupling between a first electronic circuit and a second electronic circuit according to the proposed concept or one or more examples described above may be monolithically integrated with the first electronic circuit and the second electronic circuit. In other words, a (same) die may comprise the apparatus according to the proposed concept or one or more examples described above, the first electronic circuit and the second electronic circuit (and optionally further components).

Figure 9:
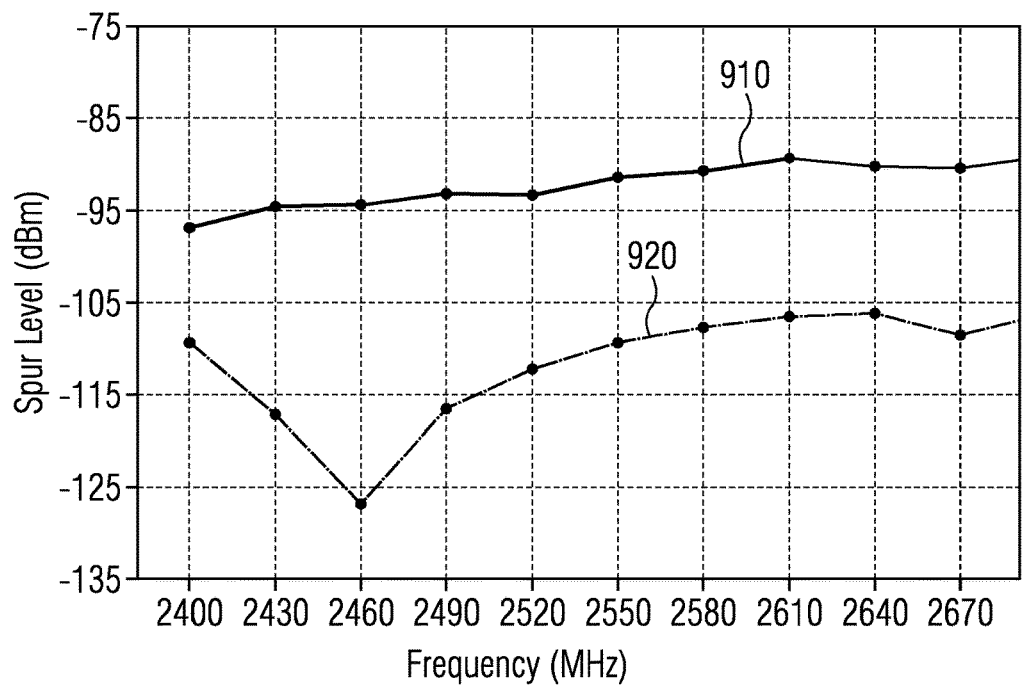
FIG. 9 illustrates a comparison of a spur level in a receive path for different magnetic shielding concepts between the receive path and an impedance matching network of a transmit path.

The effect of the proposed magnetic shielding concept on a receive path of a transceiver is illustrated in FIG. 9. FIG. 9 illustrates a comparison of a spur level in the receive path for different concepts for magnetically shielding an impedance matching network in the transceiver's transmit path. The spur level describes the fraction of unintended components in the transmission path's output signal. The abscissa of FIG. 9 denotes a frequency of the output signal of the receive path, whereas the ordinate denotes the spur level.

Line 910 denotes a situation, where no magnetic shielding structure encloses the impedance matching network of the transceiver's transmit path. In the illustrated example, the spur level is constant at around −95 dBm. On the contrary, line 920 denotes a situation, where a magnetic shielding according to the proposed concept is used for shielding the magnetic field of the impedance matching network. It is evident from FIG. 9, that the spur level is approx. 10 to 35 dBm lower. Hence, the transceiver may provide receive signals of a higher signal quality. Additionally, the proposed concept may allow to reduce a distance between the impedance matching network and further electronic components (e.g. of the receive path), so that an integration density of the transceiver may be increased.

Figure 10:
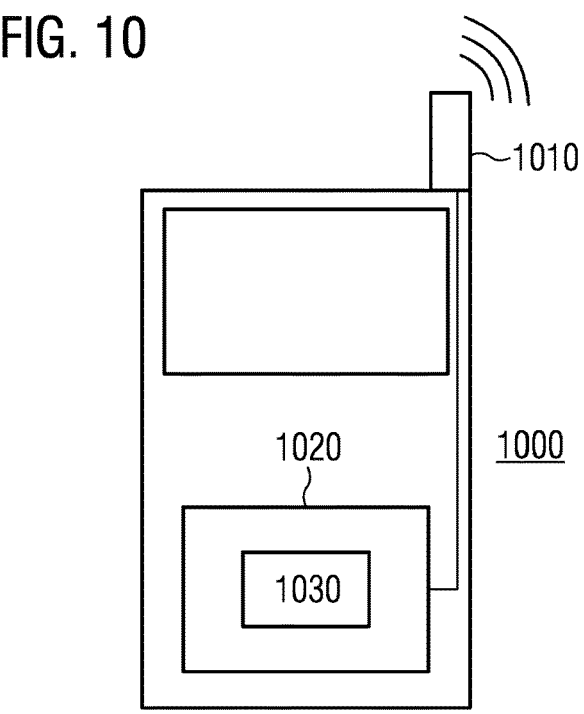
FIG. 10 illustrates an example of a mobile communications device comprising an apparatus for reducing a magnetic coupling between a first electronic circuit and a second electronic circuit.

An example of an implementation using magnetic shielding according to one or more aspects of the proposed concept or one or more examples described above is illustrated in FIG. 10. FIG. 10 schematically illustrates an example of a mobile communications device or mobile phone or user equipment 1000 comprising an apparatus 1030 for reducing a magnetic coupling between a first electronic circuit and a second electronic circuit according to an example described herein. The apparatus 1030 may be comprised by a transceiver 1020. Accordingly, the first electronic circuit and the second electronic circuit may be part of the transceiver 1020. Further, an antenna element 1010 of the mobile communications device 1000 may be coupled to the transceiver 1020. To this end, transceivers may be provided allowing reduced distances between electronic circuits. Accordingly, transceivers having an increased integration density and an increased signal quality may be provided. Hence, mobile communications devices with improved characteristics may be provided.

The examples as described herein may be summarized as follows:

Example 1 is an apparatus for reducing a magnetic coupling between a first electronic circuit and a second electronic circuit, comprising: a conductor loop enclosing the first electronic circuit or the second electronic circuit; and a tuning element coupled to the conductor loop, wherein the conductor loop and the tuning element form a resonant circuit, and wherein the tuning element is configured to adjust a resonance frequency of the resonant circuit to a frequency related to a frequency of a signal processed by the second electronic circuit.

In example 2, the resonance frequency of the apparatus of example 1 is substantially equal to the frequency of the signal processed by the second electronic circuit.

In example 3, the first electronic circuit of the apparatus of example 1 or example 2 is configured to process a second signal having a frequency different from the resonance frequency.

In example 4, the resonance frequency of the apparatus of example 4 is a multiple of the frequency of the second signal.

In example 5, the apparatus of any of the preceding examples further comprises a second conductor loop enclosing the first electronic circuit or the second electronic circuit, and a second tuning element coupled to the second conductor loop, wherein the second conductor loop and the second tuning element form a second resonant circuit, and wherein the second tuning element is configured to adjust a resonance frequency of the second resonant circuit to a second frequency related to the frequency of the signal processed by the second electronic circuit.

In example 6, the conductor loop of the apparatus of any of the preceding examples comprises an adjustable inductance.

In example 7, the conductor loop of the apparatus of example 6 comprises a first winding and a second winding, and the apparatus is configured to connect the first winding and the second winding in series at a first time instant and to connect the first winding and the second winding in parallel at a different second time instant.

In example 8, the tuning element of the apparatus of any of the preceding examples comprises an adjustable capacity.

In example 9, the tuning element of the apparatus of any of the preceding examples comprises an adjustable inductance.

In example 10, the tuning element of the apparatus of any of examples 1 to 7 comprises a capacitive element coupled to ends of the conductor loop.

In example 11, the tuning element of the apparatus of any of examples 1 to 7 comprises a parallel resonant circuit coupled to ends of the conductor loop.

In example 12, the parallel resonant circuit of the apparatus of example 11 comprises a capacitive element and an inductive element being connected in parallel between a first terminal and a second terminal of the parallel resonant circuit, wherein the first terminal and the second terminal are coupled to the ends of the conductor loop.

In example 13, the tuning element of the apparatus of any of examples 1 to 8 comprises a plurality of switchable capacitive lines being connected in parallel between ends of the conductor loop, each of the switchable capacitive lines comprising a switching element and a capacitive element connected in series.

In example 14, the number of switchable capacitive lines having a closed switching element in the apparatus of example 13 is based on the frequency of the signal processed by the second electronic circuit.

In example 15, the capacitive element is a capacitor in the apparatus of any of examples 10 to 14.

In example 16, the inductive element is an inductance coil in the apparatus of example 12.

In example 17, the first electronic circuit is an impedance matching network of a transmit path, or an oscillator in the apparatus of any of the preceding examples.

In example 18, the second electronic circuit is an impedance matching network of a receive path, a power supply network of the receive path, or a digitally controlled oscillator in the apparatus of any of the preceding examples.

In example 19, the signal processed by the second electronic circuit is a radio frequency signal in the apparatus of any of the preceding examples.

Example 20 is a die comprising an apparatus according to any of the preceding examples, the first electronic circuit and the second electronic circuit.

Example 21 is a transceiver comprising an apparatus according to any of the preceding examples.

Example 22 is a mobile communications device comprising a transceiver according to example 21.

In example 23, the mobile communications device of example 22 further comprises at least one antenna coupled to the transceiver.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for reducing a magnetic coupling between a first electronic circuit and a second electronic circuit, comprising:
   a conductor loop enclosing the first electronic circuit or the second electronic circuit; and
   a tuning element coupled to the conductor loop,
   wherein the conductor loop and the tuning element form a resonant circuit, and wherein the tuning element is configured to adjust a resonance frequency of the resonant circuit to a frequency related to a frequency of a signal processed by the second electronic circuit.

2. The apparatus of claim 1, wherein the resonance frequency is substantially equal to the frequency of the signal processed by the second electronic circuit.

3. The apparatus of claim 1, wherein the first electronic circuit is configured to process a second signal having a frequency different from the resonance frequency.

4. The apparatus of claim 3, wherein the resonance frequency is a multiple of the frequency of the second signal.

5. The apparatus of claim 1, further comprising:
a second conductor loop enclosing the first electronic circuit or the second electronic circuit; and
a second tuning element coupled to the second conductor loop,
wherein the second conductor loop and the second tuning element form a second resonant circuit, and wherein the second tuning element is configured to adjust a resonance frequency of the second resonant circuit to a second frequency related to the frequency of the signal processed by the second electronic circuit.

6. The apparatus of claim 1, wherein the conductor loop comprises an adjustable inductance.

7. The apparatus of claim 6, wherein the conductor loop comprises a first winding and a second winding, and wherein the apparatus is configured to connect the first winding and the second winding in series at a first time instant and to connect the first winding and the second winding in parallel at a different second time instant.

8. The apparatus of claim 1, wherein the tuning element comprises an adjustable capacity.

9. The apparatus of claim 1, wherein the tuning element comprises an adjustable inductance.

10. The apparatus of claim 1, wherein the tuning element comprises a capacitive element coupled to ends of the conductor loop.

11. The apparatus of claim 1, wherein the tuning element comprises a parallel resonant circuit coupled to ends of the conductor loop.

12. The apparatus of claim 11, wherein the parallel resonant circuit comprises a capacitive element and an inductive element being connected in parallel between a first terminal and a second terminal of the parallel resonant circuit, and wherein the first terminal and the second terminal are coupled to the ends of the conductor loop.

13. The apparatus of claim 1, wherein the tuning element comprises a plurality of switchable capacitive lines being connected in parallel between ends of the conductor loop, each of the switchable capacitive lines comprising a switching element and a capacitive element connected in series.

14. The apparatus of claim 13, wherein the number of switchable capacitive lines having a closed switching element is based on the frequency of the signal processed by the second electronic circuit.

15. The apparatus of claim 10, wherein the capacitive element is a capacitor.

16. The apparatus of claim 12, wherein the inductive element is an inductance coil.

17. The apparatus of claim 1, wherein the first electronic circuit is an impedance matching network of a transmit path, or an oscillator.

18. The apparatus of claim 1, wherein the second electronic circuit is an impedance matching network of a receive path, a power supply network of the receive path, or a digitally controlled oscillator.

19. The apparatus of claim 1, wherein the signal processed by the second electronic circuit is a radio frequency signal.

20. A die comprising the apparatus according to claim 1, the first electronic circuit and the second electronic circuit.

21. A transceiver comprising the apparatus according to claim 1.

22. A mobile communications device comprising the transceiver according to claim 21.

23. The mobile communications device of claim 22, further comprising at least one antenna coupled to the transceiver.

* * * * *